(12) United States Patent
Cohen

(10) Patent No.: US 8,047,493 B1
(45) Date of Patent: Nov. 1, 2011

(54) MOTORCYCLE CONTAINER HOLDER SYSTEM

(76) Inventor: Larry K. Cohen, Granville, TN (US)

( * ) Notice: Subject to any disclaimer, the term of this patent is extended or adjusted under 35 U.S.C. 154(b) by 289 days.

(21) Appl. No.: 12/381,279

(22) Filed: Mar. 10, 2009

(51) Int. Cl.
*A47K 1/08* (2006.01)

(52) U.S. Cl. ..................... 248/311.2; 248/300

(58) Field of Classification Search ............... 248/311.2, 248/311.3, 102; 220/738, 739
See application file for complete search history.

(56) References Cited

U.S. PATENT DOCUMENTS

| | | | | |
|---|---|---|---|---|
| 2,530,695 A | * | 11/1950 | Helmert | 224/586 |
| 4,044,932 A | * | 8/1977 | Harris, Jr. | 224/242 |
| 4,256,281 A | | 3/1981 | Harris | |
| 4,310,040 A | * | 1/1982 | Shainfeld | 206/37.4 |
| D281,830 S | * | 12/1985 | Hengesbach | D3/229 |
| D286,949 S | * | 12/1986 | Hardman | D3/229 |
| D293,857 S | * | 1/1988 | Stout et al. | D3/229 |
| 5,169,025 A | * | 12/1992 | Guo | 220/739 |
| 5,622,346 A | * | 4/1997 | Story, Jr. | 248/311.2 |
| 6,691,497 B1 | * | 2/2004 | Rodgers | 54/6.1 |
| D537,402 S | | 2/2007 | Smith | |
| D567,740 S | | 4/2008 | Smith | |

* cited by examiner

*Primary Examiner* — Amy J Sterling

(57) ABSTRACT

A major component includes a horizontally extending first section, a horizontally extending second section, and a central section. The central section has a centerline. A plurality of vertically spaced primary holes is provided in the second section on each side of the centerline. A plurality of vertically spaced secondary holes is provided in the first section on each side of the centerline. A first cord is positioned through the primary and secondary holes on one side of the centerline. A second cord is positioned through the primary and secondary holes on the other side of the centerline. In this manner the major component forms a support. Further in this manner a container is removably held.

1 Claim, 5 Drawing Sheets

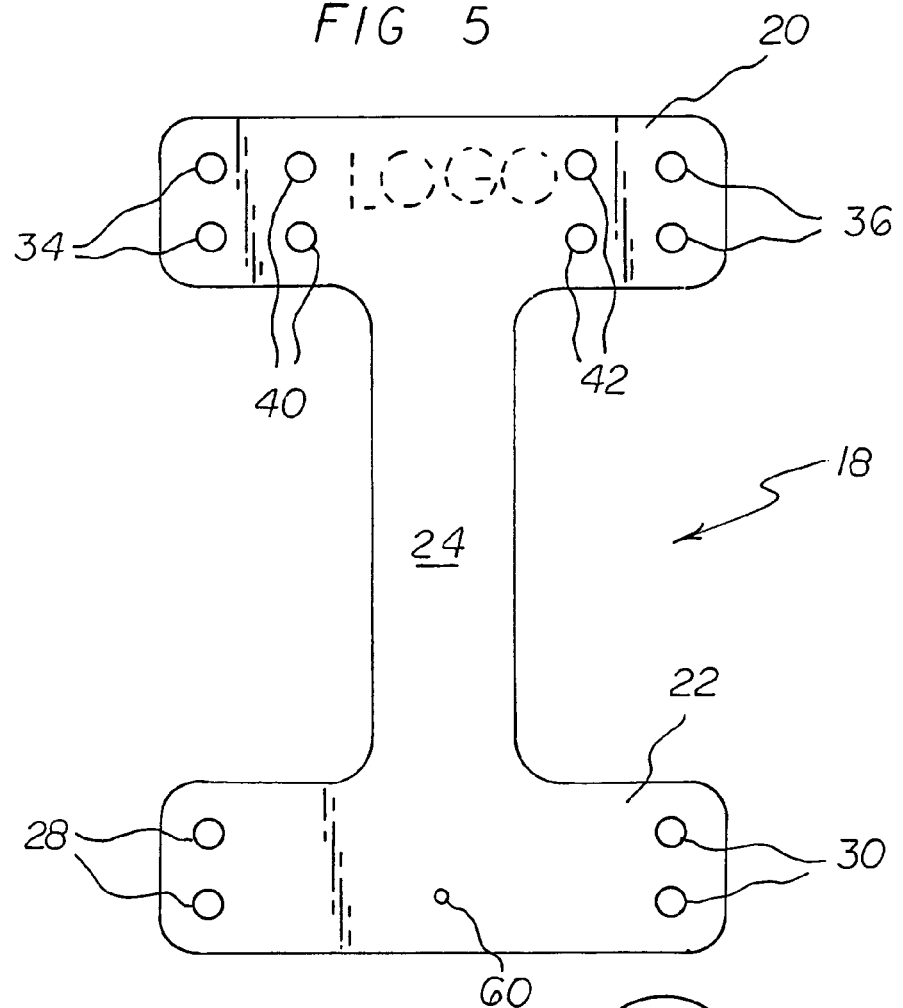
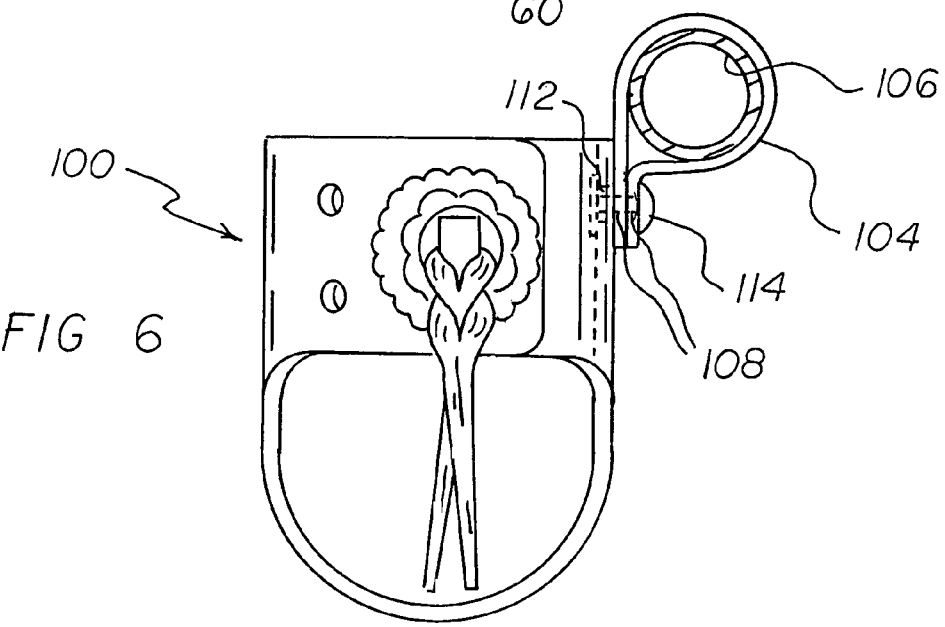

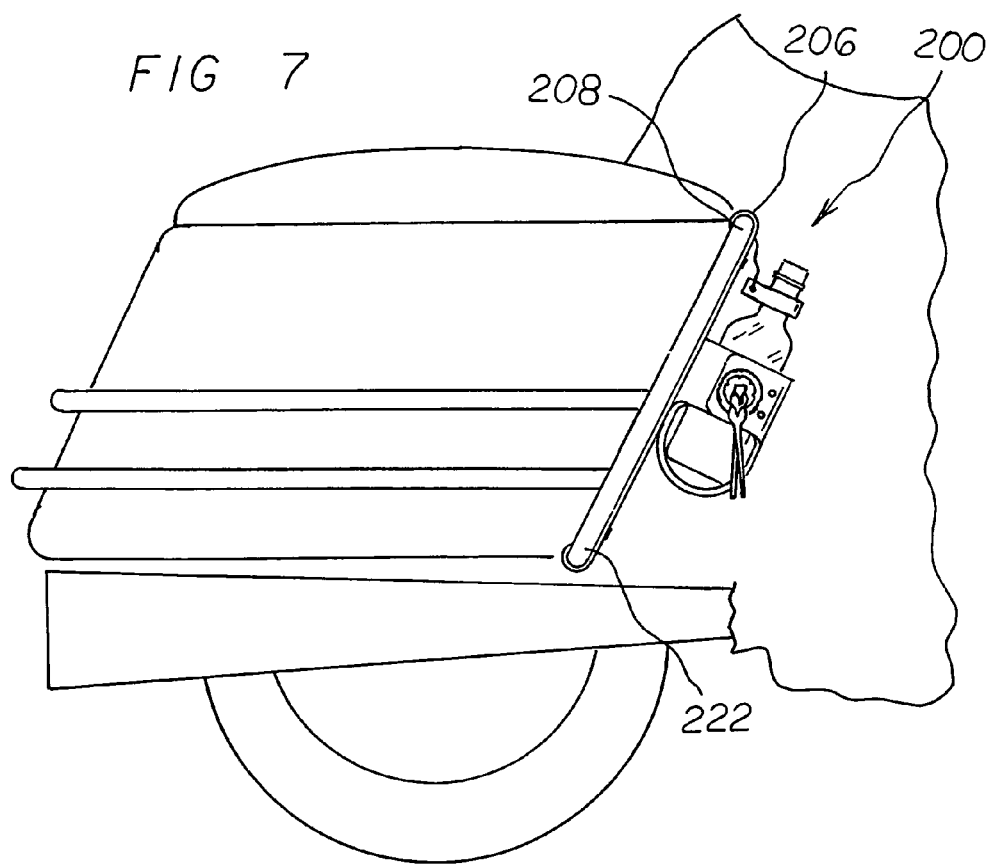
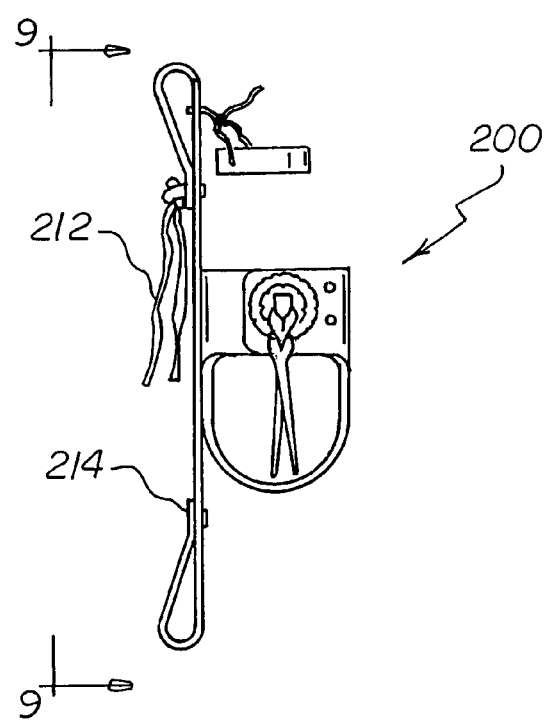

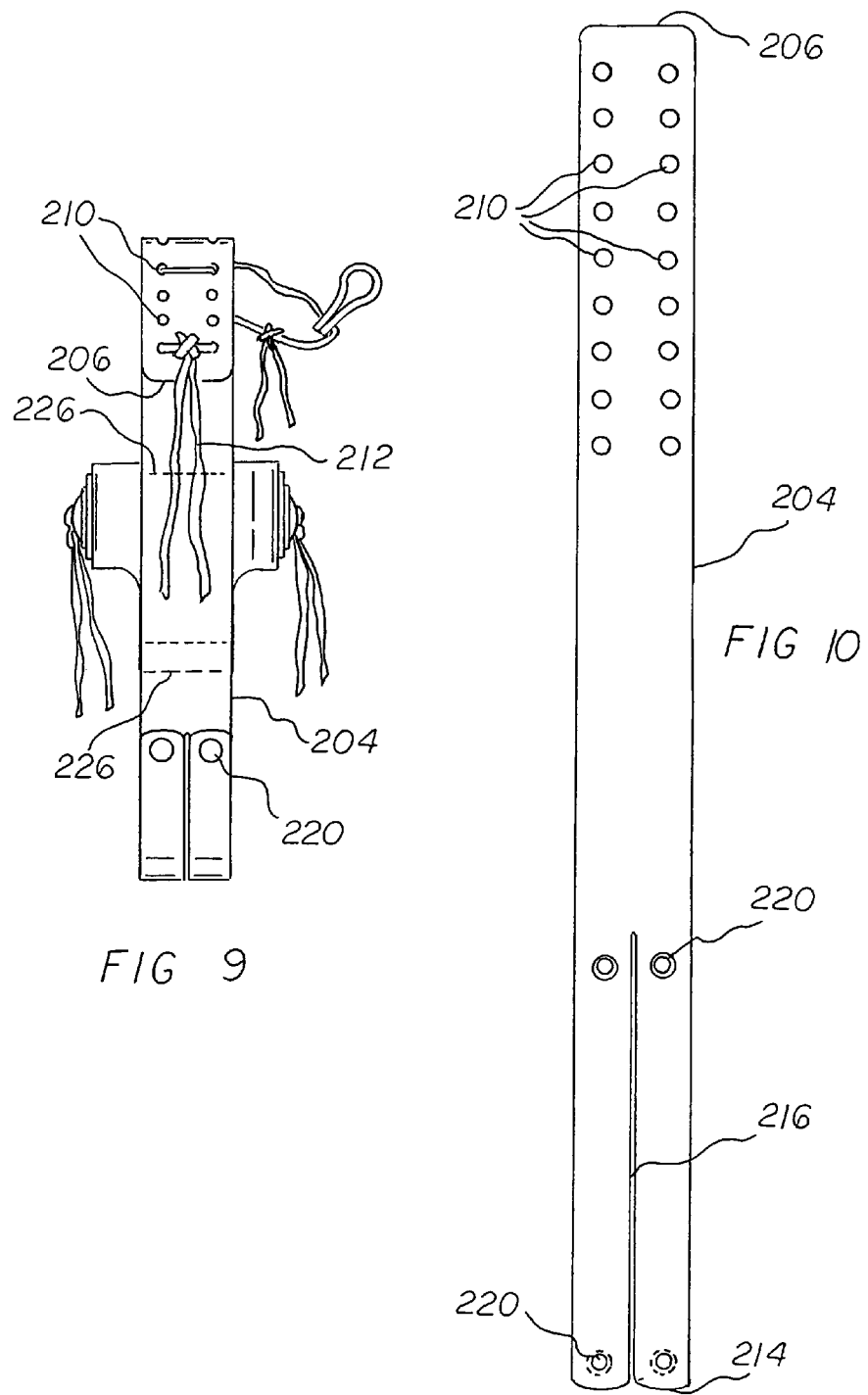

MOTORCYCLE CONTAINER HOLDER SYSTEM

BACKGROUND OF THE INVENTION

1. Field of the Invention

The present invention relates to a motorcycle container holder system and more particularly pertains to removably supporting a bottle, a cup, a can and like beverage containers, the supporting being done in a safe, convenient, economical and eye-appealing manner.

2. Description of the Prior Art

The use of container holders of known designs and configurations is known in the prior art. More specifically, container holders of known designs and configurations previously devised and utilized for the purpose of holding containers through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,256,281 issued Mar. 17, 1981 to Harris relates to a Cup Holding Apparatus. U.S. Pat. No. D537,402 issued Feb. 27, 2007 to Smith relates to a Mounting Bracket for Cup Holder. Lastly, U.S. Pat. No. D567,740 issued Apr. 29, 2008 to Smith relates to a Motorcycle Cup Holder.

While these devices fulfill their respective, particular objectives and requirements, the aforementioned patents do not describe a motorcycle container holder system that allows for removably supporting a bottle, a cup, a can and like beverage containers, the supporting being done in a safe, convenient, economical and eye-appealing manner.

In this respect, the motorcycle container holder system according to the present invention substantially departs from the conventional concepts and designs of the prior art, and in doing so provides an apparatus primarily developed for the purpose of removably supporting a bottle, a cup, a can and like beverage containers, the supporting being done in a safe, convenient, economical and eye-appealing manner.

Therefore, it can be appreciated that there exists a continuing need for a new and improved motorcycle container holder system which can be used for removably supporting a bottle, a cup, a can and like beverage containers, the supporting being done in a safe, convenient, economical and eye-appealing manner. In this regard, the present invention substantially fulfills this need.

SUMMARY OF THE INVENTION

In view of the foregoing disadvantages inherent in the known types of container holders of known designs and configurations now present in the prior art, the present invention provides an improved motorcycle container holder system. As such, the general purpose of the present invention, which will be described subsequently in greater detail, is to provide a new and improved motorcycle container holder system and method which has all the advantages of the prior art and none of the disadvantages.

To attain this, the present invention essentially comprises a motorcycle container holder system. First provided is a beverage container. The beverage container has a top. The beverage container has a closed bottom. The beverage container has a cylindrical side wall.

A major component is provided. The major component is in a generally I-shaped configuration. The major component includes a horizontally extending first section. The major component includes a similarly configured horizontally extending second section. The first and second sections are generally rectangular. The first and second sections have a width of about 8 inches. The first and second sections have a height of about 2.5 inches. The major component also includes a central section. The central section has a centerline. The central section has a width of about 2 inches. The central section has a height of about 5 inches. The central section has a first region. The first region is integrally formed with the first section at a central extent of the first section. The central section has a second region. The second region is integrally formed with the second section at a central extent of the second section. The first and second and central sections are fabricated of a single piece of leather.

Provided next is a plurality of primary securement holes. The primary securement holes are provided in the second section on each side of the centerline. The primary securement holes are laterally spaced from the centerline by about 3 inches. The primary securement holes are vertically spaced from one another by about 1 inch.

A plurality of secondary securement holes is provided. The secondary securement holes are provided in the first section on each side of the centerline. The secondary securement holes are laterally spaced from the centerline by about 3 inches. The secondary securement holes are vertically spaced from one another by about 1 inch.

A plurality of tertiary securement holes is provided. The tertiary securement holes are provided in the first section on each side of the centerline. The tertiary securement holes are laterally spaced from the centerline by about 2 inches. The secondary securement holes are vertically spaced from one another by about 1 inch. The tertiary holes are laterally spaced from each other by a distance less than the lateral distance between the secondary holes.

A first cord is provided next. The first cord is positioned through the primary and secondary securement holes on one side of the centerline. A second cord is provided. The second cord is positioned through the primary and secondary securement holes on the other side of the centerline. In this manner the first and second sections form a cylindrical support. Further in this manner the side wall of the container is removably supported while the bottom of the container is removably supported by the central section.

The first cord is positionable through the primary and secondary securement holes on one side of the centerline. The second cord is positionable through the primary and secondary securement holes on the other side of the centerline. In this manner the first and second sections form a cylindrical support. The cylindrical support is adapted to removably support the side wall of a smaller container. Also in this manner the bottom of the smaller container is removably supported by the central section.

A concho is provided for each cord. Each concho has two apertures. Each aperture receives one of the cords. Each cord has a slit. In this manner the cord is secured with respect to the concho and to the major component.

Further provided is a small aperture. The small aperture is provided in the second section on the centerline.

Provided last is a bolt. The bolt extends through the small aperture. The bolt further extends through an aperture in a windshield of a motorcycle. In this manner the system is coupled to the motorcycle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motorcycle container holder system which has all of the advantages of the prior art container holders of known designs and configurations and none of the disadvantages.

It is another object of the present invention to provide a new and improved motorcycle container holder system which may be easily and efficiently manufactured and marketed.

It is further object of the present invention to provide a new and improved motorcycle container holder system which is of durable and reliable constructions.

An even further object of the present invention is to provide a new and improved motorcycle container holder system which is susceptible of a low cost of manufacture with regard to both materials and labor, and which accordingly is then susceptible of low prices of sale to the consuming public, thereby making such motorcycle container holder system economically available to the buying public.

Even still another object of the present invention is to provide a motorcycle container holder system for removably supporting a bottle, a cup, a can and like beverage containers, the supporting being done in a safe, convenient, economical and eye-appealing manner.

Lastly, it is an object of the present invention to provide a new and improved motorcycle container holder system. A major component includes a horizontally extending first section, a horizontally extending second section, and a central section. The central section has a centerline. A plurality of vertically spaced primary holes is provided in the second section on each side of the centerline. A plurality of vertically spaced secondary holes is provided in the first section on each side of the centerline. A first cord is positioned through the primary and secondary holes on one side of the centerline. A second cord is positioned through the primary and secondary holes on the other side of the centerline. In this manner the major component forms a support. Further in this manner a container is removably held.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front elevational view of the major component of the system.

FIG. 6 is a side elevational view of an alternate embodiment of the invention.

FIG. 7 is a side elevational view of a final alternate embodiment of the invention.

FIG. 8 is an enlarged side elevational view of the final alternate embodiment of the invention independent of the motorcycle.

FIG. 9 is a rear elevational view taken along line 9-9 of FIG. 8.

FIG. 10 is a front elevational view of the major component of the system illustrated in FIGS. 7, 8 and 9.

The same reference numerals refer to the same parts throughout the various Figures.

DESCRIPTION OF THE PREFERRED EMBODIMENT

Figure 1:
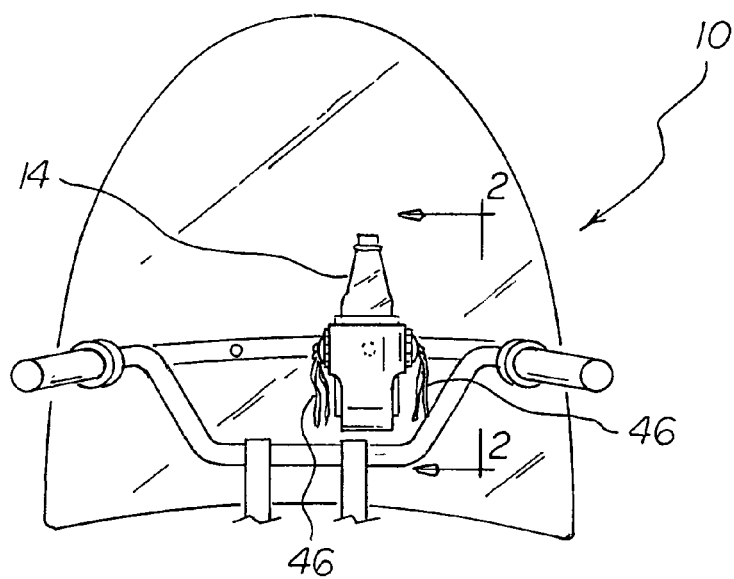
FIG. 1 is a front elevational view of a motorcycle cup holder system constructed in accordance with the principles of the present invention.
Figure 2:
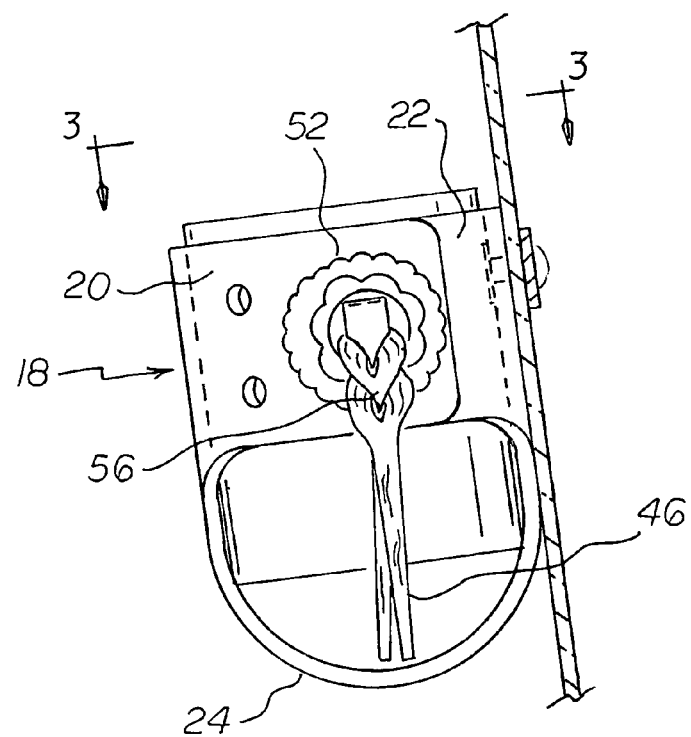
FIG. 2 is a side elevational view of the system taken along line 2-2 of FIG. 1.
Figure 3:
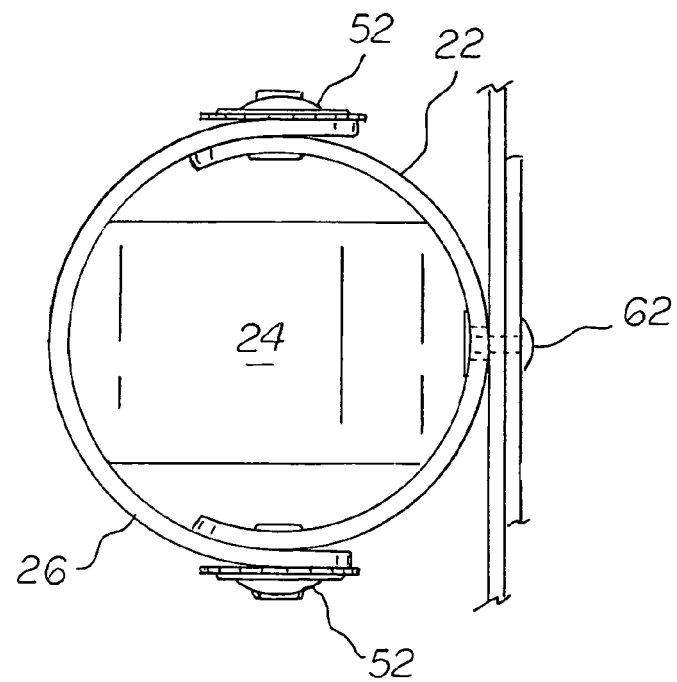
FIG. 3 is a plan view of the system taken along line 3-3 of FIG. 2.
Figure 4:
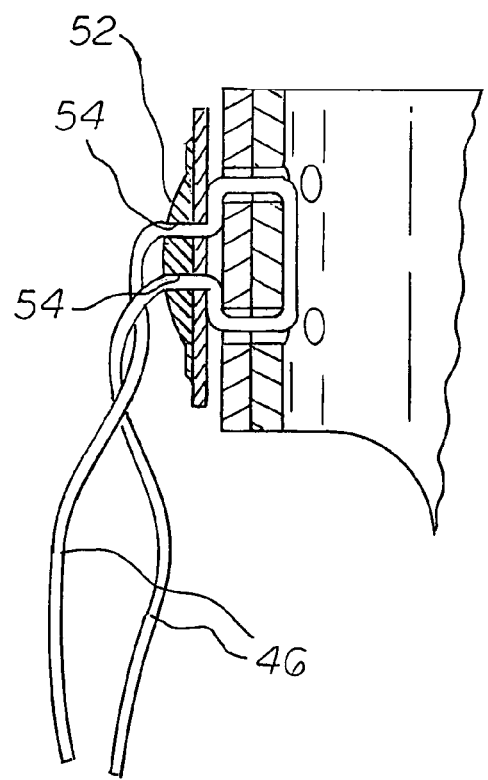
FIG. 4 is a cross sectional view taken along line 4-4 of FIG. 3.

With reference now to the drawings, and in particular to FIG. 1 thereof, the preferred embodiment of the new and improved motorcycle container holder system embodying the principles and concepts of the present invention and generally designated by the reference numeral 10 will be described.

The present invention, the motorcycle container holder system 10 is comprised of a plurality of components. Such components in their broadest context include a major component, a plurality of vertically spaced primary holes, a plurality of vertically spaced second holes and a first cord. Such components are individually configured and correlated with respect to each other so as to attain the desired objective.

First provided is a beverage container 14. The beverage container has a top. The beverage container has a closed bottom. The beverage container has a cylindrical side wall.

A major component 18 is provided. The major component is in a generally I-shaped configuration. The major component includes a horizontally extending first section 20. The major component includes a similarly configured horizontally extending second section 22. The first and second sections are generally rectangular. The first and second sections have a width of about 8 inches. The first and second sections have a height of about 2.5 inches. The major component also includes a central section 24. The central section has a centerline. The central section has a width of about 2 inches. The central section has a height of about 5 inches. The central section has a first region. The first region is integrally formed with the first section at a central extent of the first section. The central section has a second region. The second region is integrally formed with the second section at a central extent of the second section. The first and second and central sections are fabricated of a single piece of leather.

Provided next is a plurality of primary securement holes 28, 30. The primary securement holes are provided in the second section on each side of the centerline. The primary securement holes are laterally spaced from the centerline by about 3 inches. The primary securement holes are vertically spaced from one another by about 1 inch.

A plurality of secondary securement holes 34, 36 is provided. The secondary securement holes are provided in the first section on each side of the centerline. The secondary securement holes are laterally spaced from the centerline by about 3 inches. The secondary securement holes are vertically spaced from one another by about 1 inch.

A plurality of tertiary securement holes 40, 42 is provided. The tertiary securement holes are provided in the first section on each side of the centerline. The tertiary securement holes are laterally spaced from the centerline by about 2 inches. The secondary securement holes are vertically spaced from one another by about 1 inch. The tertiary holes are laterally spaced from each other by a distance less than the lateral distance between the secondary holes.

A first cord 46 is provided next. The first cord is positioned through the primary and secondary securement holes on one side of the centerline. A second cord 48 is provided. The second cord is positioned through the primary and secondary securement holes on the other side of the centerline. In this manner the first and second sections form a cylindrical support. Further in this manner the side wall of the container is removably supported while the bottom of the container is removably supported by the central section.

The first cord is positionable through the primary and secondary securement holes on one side of the centerline. The second cord is positionable through the primary and secondary securement holes on the other side of the centerline. In this manner the first and second sections form a cylindrical support. The cylindrical support is adapted to removably support the side wall of a smaller container. Also in this manner the bottom of the smaller container is removably supported by the central section.

A concho 52 is provided for each cord. Each concho has two apertures 54. Each aperture receives one of the cords. Each cord has a slit 56. In this manner the cord is secured with respect to the concho and to the major component.

Further provided is a small aperture 60. The small aperture is provided in the second section on the centerline.

Provided last is a bolt 62. The bolt extends through the small aperture. The bolt further extends through an aperture in a windshield of a motorcycle. In this manner the system is coupled to the motorcycle.

An alternate embodiment 100 of the present invention is shown in FIG. 6.

A supplemental short strap 104 is provided. A tubular handlebar 106 of a motorcycle is provided. The supplemental short strap is positionable around the tubular handlebar of a motorcycle. The supplemental short strap has opposed ends. The opposed ends have attachment apertures 108.

Provided next is a small aperture 112. The small aperture is provided in the second section on the centerline.

Further provided is a bolt 114. The bolt extends through the small aperture. The bolt further extends through the attachment apertures. In this manner the system is coupled to the motorcycle.

Provided last is stitching 116. The stitching couples the major portion to the supplemental short strap.

Another alternate embodiment 200 of the present invention is shown in FIGS. 7, 8, 9 and 10.

A supplemental long strap 204 is provided. The supplemental long strap has a first end 206. A tubular member 208 of an upper rearward portion of a motorcycle is provided. The first end is positionable around the first tubular member. The first end has a plurality of laterally spaced holes 210. The first end has a rearward cord 212. The rearward cord is positioned through the laterally spaced holes for securement purposes. The supplemental long strap has a second end 216. The second end has an axial slit 218. The axial slit divides the second end into two parts. Snaps 220 are provided. The snaps are provided on each part. A second tubular member 222 of a lower rearward portion of a motorcycle is provided. In this manner the supplemental strap is positioned around the second tubular member.

Stitching 226 is provided. The stitching couples the major portion to the supplemental long strap.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A motorcycle container holder system for removably supporting a bottle, a cup, a can and like beverage containers, comprising:

a beverage container having a top and a closed bottom and a cylindrical side wall;

a major component in a generally I-shaped configuration including a horizontally extending first section and a similarly configured horizontally extending second section, the first and second sections being generally rectangular and having a width of about 8 inches and a height of about 2.5 inches, the major component also including a central section with a centerline, the central section having a width of about 2 inches and a height of about 5 inches, the central section having a first region integrally formed with the first section at a central extent of the first section, the central section having a second region integrally formed with the second section at a central extent of the second section, the first and second and central sections being fabricated of a single piece of leather;

a plurality of primary securement holes in the second section on each side of the centerline, the primary securement holes being laterally spaced from the centerline by about 3 inches, the primary securement holes being vertically spaced from one another by about 1 inch;

a plurality of secondary securement holes in the first section on each side of the centerline, the secondary securement holes being laterally spaced from the centerline by about 3 inches, the secondary securement holes being vertically spaced from one another by about 1 inch;

a plurality of tertiary securement holes in the first section on each side of the centerline, the tertiary securement holes being laterally spaced from the centerline by about 2 inches, the secondary securement holes being vertically spaced from one another by about 1 inch, the tertiary holes being laterally spaced from each other by a distance less than the lateral distance between the secondary holes;

a first cord positioned through the primary and secondary securement holes on one side of the centerline and a second cord positioned through the primary and secondary securement holes on the other side of the centerline whereby the first and second sections form a cylindrical support for removably supporting the side wall of the container while the central section removably supports the bottom of the container;

the first cord positionable through the primary and secondary securement holes on one side of the centerline and a second cord positionable through the primary and secondary securement holes on the other side of the centerline whereby the first and second sections form a cylindrical support adapted to removably support the side wall of a smaller container while the central section removably supports the bottom of the smaller container;

a concho for each cord, each concho having two apertures for the receipt of one of the cords, each cord having a slit for securing the cord with respect to the concho and to the major component;

a small aperture in the second section on the centerline; and a motorcycle having a windshield, the windshield having a windshield aperture, a bolt extending through the small aperture and through the windshield aperture for coupling the system to the motorcycle.

* * * * *